United States Patent [19]
Lederer

[11] 3,954,009
[45] May 4, 1976

[54] FLOW METER
[75] Inventor: Louis Franklin Lederer, Lincoln, Nebr.
[73] Assignee: Instrumentation Specialties Company, Lincoln, Nebr.
[22] Filed: Oct. 4, 1972
[21] Appl. No.: 295,012

[52] U.S. Cl................................. 73/198; 73/215; 235/151.34; 340/206
[51] Int. Cl.²...................... G01N 1/10; G01F 1/04
[58] Field of Search.................. 73/421 B, 198, 206, 73/215, 216; 340/206; 250/231 R, 231 SE; 235/151.34

[56] References Cited
UNITED STATES PATENTS

| | | | |
|---|---|---|---|
| 1,843,552 | 2/1932 | Gibson | 73/198 |
| 2,088,568 | 8/1937 | Beecher | 73/206 |
| 2,639,858 | 5/1953 | Hays | 73/206 |
| 2,708,745 | 5/1955 | Chappell et al. | 340/206 |
| 2,923,925 | 2/1960 | Dickinson | 340/206 |
| 2,989,642 | 6/1961 | Svec | 250/231 SE |
| 3,719,081 | 3/1973 | Lynn | 73/206 |

FOREIGN PATENTS OR APPLICATIONS

| | | | |
|---|---|---|---|
| 608,024 | 1/1935 | Germany | 340/206 |

*Primary Examiner*—S. Clement Swisher
*Attorney, Agent, or Firm*—Vincent L. Carney

[57] ABSTRACT

To measure the volume of fluid that has flowed past a point and to actuate a sampler at certain increments of this volume, a stylus of a flow meter moves to a distance from the center of rotation of a rotating function disc, which distance is related to the height of a float in the fluid stream, with the function disc including a conductive portion having different arcuate lengths at different distances from the center of rotation so that, as the disc rotates, the stylus circumscribes a circle around the function disc at a distance related to the height of the float and is in contact with the conductive portion for a period of time that represents the rate of flow of the fluid that corresponds to the height of the float. Pulses representing in number the rate of flow of the fluid during each revolution are applied to a counter while the stylus contacts the conductive portion which accumulates them to form the integral with respect to the time of the rate of flow, with the output from the counter being used to actuate a liquid sampler at predetermined increments of volume of fluid flowing past the float.

4 Claims, 3 Drawing Figures

FLOW METER

This invention relates to fluid flow meters.

One class of flow meter obtains a signal indicating a characteristic of the rate of flow of the fluid such as a mechanical motion from a float indicating the height of the fluid as it flows through a weir. This signal is then corrected to compensate for the shape of the weir and integrated to provide signals indicating the volume of fluid flowing past the float. The signals from the integrator may be used to actuate the fluid sampler at periodic increments of volume of fluid flowing through the fluid meter.

In one type of prior art flow meters of this class, the signal indicating the rate of flow of the fluid is an analog signal which is integrated by a mechanical integrator to obtain the volume.

This type of prior art flow meter has several disadvantages, such as: (1) because of the high friction within the integrator and heavy weight of its parts, it is relatively inaccurate, being affected by a large hysteresis as the level of the fluid rises and falls; (2) the unit is heavy and difficult to handle because of the large amount of power required and the relatively large and heavy parts included in it; (3) the unit is expensive because of the large number of relatively complicated and expensive parts; (4) the unit has to be supplied with power more frequently and does not run untended for long periods of time; (5) an excessive number of openings are required in the meter to handle the various settings and these openings cause the meter to be damaged after a long period of time by the corrosive environment in which such meters are often used; and (6) it is difficult to accommodate the meter to make measurements at different locations because a correction must be applied to the initial measurements and this correction is different for some locations, thus requiring a different relatively expensive and difficult to fabricate mechanical cam for such different locations.

Accordingly, it is an object of this invention to provide a novel method and apparatus for measuring the rate of flow of fluids.

It is a further object of the invention to provide a novel method and apparatus for actuating a liquid sampler.

It is a still further object of the invention to provide a novel method and apparatus for measuring the volume of the fluid flowing past a point.

It is a still further object of the invention to provide a novel method and apparatus for generating a digital signal representing a first variable such as the rate of flow of a fluid from an analog signal representing a second variable related to the first variable such as the height of the fluid as it flows at the rate to be determined.

It is a still further object of the invention to provide a method and apparatus for calculating a variable such as the rate of flow of a fluid from an analog value such as the height of a stream of the fluid and simultaneously converting the variable into a digital signal using the same equipment for both the conversion and the calculation.

It is a still further object of the invention to provide a method and apparatus for obtaining a digital signal representing the rate of flow of a fluid from a mechanical motion representing another related characteristic of the fluid.

It is a still further object of the invention to provide a novel method and apparatus for enabling a flow meter to be easily and economically adapted to measure the rate of flow of the fluid under different conditions requiring a different calculation for the flow rate.

It is a still further object of this invention to provide a novel flow rate meter which is especially light in weight, accurate, has low hysteresis in operation and is economical to construct and operate.

In accordance with the above and further objects of the invention, a flow rate meter is provided having: (1) fluid characteristic measuring apparatus for obtaining a signal containing information indicating the rate of flow of a fluid and also other irrelevant information such as the nonlinear distortion of the information indicating rate of flow caused by a weir as described more fully hereinafter; (2) a function operator for removing the irrelevant information from the signal and for converting the signal to a form easily processed; and (3) a calculator section for integrating the signal with respect to time to provide another signal indicating the volume of liquid that has flown past a given point.

One type of fluid characteristic measuring apparatus for obtaining a signal containing information representing the rate of flow of the fluid includes a float positioned in stream of the fluid and attached to a shaft to impart an angular displacement to the shaft representing the changes in the height of the float. However, there are other types of apparatuses that may be used with the invention to generate signals containing information representing the rate of flow of the fluid. These apparatuses generally develop a signal that includes errors due to nonlinear distorting of the information as well as the information representing the rate of flow of the fluid.

To remove the distortion from the signal, the function operator, in one embodiment, includes a shaft, a function disc and a movable electric contact stylus, with the contact stylus having one end mounted to the shaft and having its other end movably positioned in intimate contact with and movable with respect to the function disc. The function disc rotates at constant angular velocity such that the end of the stylus that is in intimate contact with the rotating disc assumes a position a distance from the center of rotation of the rotating function disc that is related to the distorted signal containing the rate of flow information. As the function disc rotates, the end of the movable electrical contact stylus describes circles on the face of the disc having radii related to the magnitude of the signal.

The function disc includes a conductive portion and shaped such that, in each circular path of the stylus, the ratio of the arc length of the conductive portion to total length of the circle is the same as the ratio of the function of the signal that represents the rate of flow of the fluid to the full scale rates of the apparatus so that the time the stylus is in contact with the conductive portion during each revolution of the rotating function disc is proportional to the rate of flow of the fluid. In one embodiment the conductive portion is energized with periodic electrical pulses from a pulse generator and in another embodiment the pulse generator is turned on when the stylus is in contact with the conductive portion and turned off when it is not in contact with the conductive portion. In both of these embodiments, a series of periodic electrical pulses are made available when the stylus is in contact with the conductive portion. The rotating function disc is conveniently prepared by conventional printed circuit techniques from computer generated information on a plastic disc and a separate disc may be substituted for each set of different measuring conditions.

In another embodiment, the function disc includes a portion that passes light and a portion that blocks light rather than conductive and nonconductive portions and a light sensing device is radially positioned with respect to the disc by the shaft rather than an electrical contact stylus. The light passing portion is periodically energized by a lamp on the opposite side of the disc, which lamp is periodically illuminated so that the light sensing device receives light pulses when it is opposite to the light passing portion.

To convert the signal that is proportional to the rate of flow of the fluid into a form easily processed, the function operator includes a pulse generator connected in the one embodiment to a brush that electrically energizes the conductive portion of the rotating function disc with periodic pulses so that the movable contact stylus is energized by periodic electrical pulses when it is in contact with the conductive portion of the rotating function disc and not at other times and in another embodiment the pulse generator is turned on when the movable contact stylus is in contact with the conductive portion and turned off when it is not in contact with the conductive portion. In still another embodiment, the pulse generator is electrically connected to the lamp to periodically energize the light sensor when it is opposite to the light passing portions of the rotating function disc. Accordingly, the number of pulses applied to the movable contact stylus generated by the pulse generator or generated by the light sensor in each complete revolution of the rotating function disc is proportional to the rate of flow of the fluid.

The pulses from the contact stylus pulse generator or light sensor are applied to a counter, which integrates the rate of flow of the fluid with respect to time by counting the pulses. The output taps of the counter are used to actuate a liquid sampling device at predetermined increments of volume of the flow of the liquid.

It may be understood from the above description that the flow meter of this invention has several advantages, such as: (1) it is inexpensive because of its simplicity and small number of parts; (2) it is light in weight and easy to handle because its parts are light and a relatively small power supply is sufficient; (3) it is highly accurate since it has few moving parts and these are light in weight and operate with little friction; (4) it operates for a relatively long period of time without being reset; (5) it is durable and able to resist corrosive environments in which it may be used because it has few openings; and (6) it is easily adjusted for different uses by replacing the function disk.

The above-noted and other features of the invention will be better understood from the following detailed description when considered with reference to the accompanying drawings in which.

Figure 1:
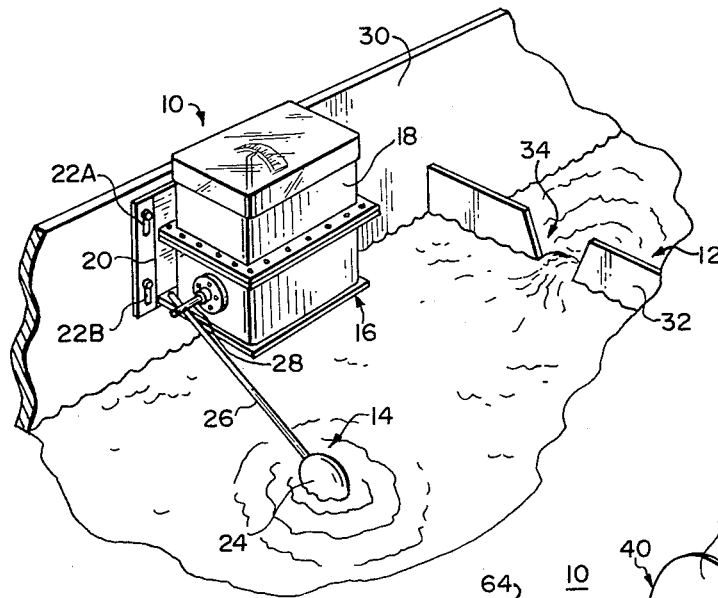
FIG. 1 is a simplified perspective view of a flow meter according to an embodiment of the invention.

In FIG. 1, there is shown a perspective view of a flow meter 10 mounted in operating position with respect to a weir 12 to monitor the flow of fluid therethrough, with the flow meter 10 including a float assembly 14 and a metering assembly 16.

The metering assembly 16 includes a housing 18 which contains and protects the operating parts of the metering assembly 16. The housing 18 consists of corrosion resistant materials such as plastic and stainless steel and is liquid tight to protect the internal operating parts. The top is of transparent plastic so that the controls can be observed from the top as will be hereinafter more fully explained.

To mount the housing 18, a vertical mounting plate 20 is fastened to one side of the housing 18 and includes near the edges of its vertical sides four elongated vertically arranged slots, two of which are shown in FIG. 1 at 22A and 22B. The slots are adapted to receive fasteners such as bolts by which the vertical mounting plate 20 and therefore the housing 18 are mounted to a vertical wall, which may be one wall of the weir 12 as shown in FIG. 1. The elongated slots permit the mounting plate 20 and housing 18 to be positioned at different selected vertical heights, which provides one manner of calibration as will be described more fully hereinafter.

To provide the basic indications from which the flow meter 10 calculates the rate of flow of the fluid, the float assembly 14 includes a float arm 26 and a float 24, resting within a body of water flowing through the weir 12, with the float arm 26 being connected at one end to the float 24 and at the other end to a meter input shaft 28. The float arm 26 extends in a direction transverse to the meter input shaft 28 so that, as the float 24 rises and falls with the level of the fluid within the weir 12, the meter input shaft at 28 rotates in a first direction as the float rises and in a second direction as the float falls.

The weir 12 is a conventional V-notch weir having vertical walls, two of which are shown at 30 and 32, with the wall 30 supporting the vertical mounting plate 20 and the wall 32 being a vertical retaining wall connected to the wall 30 and having a V-shaped notch at 34 so that the retaining wall 32 creates a water head in which the float 24 floats and permits the water to flow through the V-notch 34.

Although in FIG. 1 the float assembly 14 and the weir 12 are shown cooperating with the metering assembly 16 to provide basic measurements from which the metering assembly determines the rate of flow of fluid, other conventional arrangements may be used to provide basic indications. For example, a still well may be used with a different type of float, actuated from a pulley in a conventional manner. Moreover, mechanisms which do not utilize a float at all may be used such as: (1) echo ranging devices which determine the height of the water by timing ultrasonic sound vibrations or electromagnetic radiations that are reflected from the surface of the water; or (2) pressure measuring apparatuses which measure the pressure required to bubble fluid to the surface of the water or the pressure created in the direction of the flow of the fluid.

While many different types of arrangements may be used to provide the basic data concerning the flow rate, particular benefits are obtained by using devices which measure the height of the liquid and provide indications of this height to the metering assembly 16.

Figure 2:
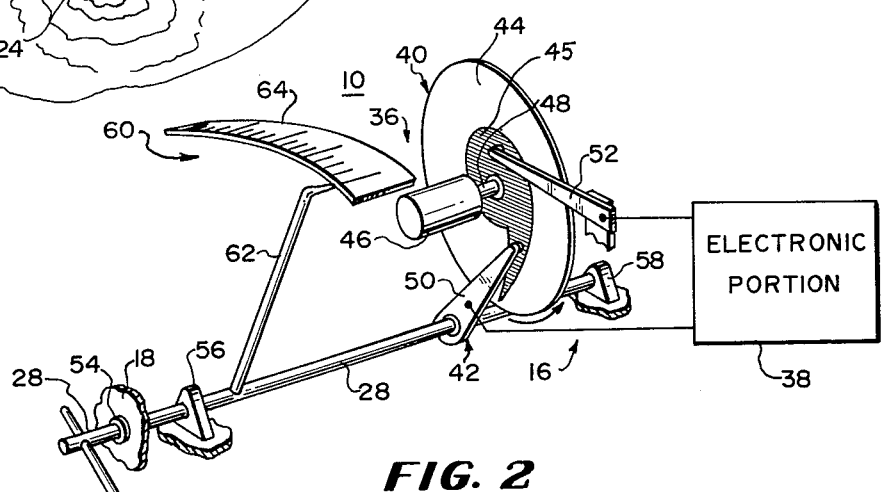
FIG. 2 is a simplified diagramatic view, partly in perspective, of the moving parts of the flow meter of FIG. 1.

In FIG. 2, there are shown, in a simplified diagrammatic perspective view, the float assembly 14 and the operating parts of the metering assembly 16 as they are connected together for operation.

The metering assembly 16 includes a function operator section 36 and a calculating section (not shown in FIG. 2) with the function operator section being connected to the float assembly 14 through the meter input shaft 28 to receive the basic measurements indicating rate of flow of the fluid and to the calculating section within the electronic portion 38 to which it provides a signal indicating the amount of fluid that has passed the float. As will be explained in greater detail hereinafter with reference to FIG. 3, the calculating section uses this information to generate actuating signals such as signals to start a water sampler.

To operate on the basic measured data by a function, the function operator section 36 includes a function disc assembly 40 and an operator assembly 42, with the function disc 44 and an electrical motor 46, connected to the function disc 44 through an output shaft 48 to rotate the function disc. The function disc 44 is a rotatable plastic disc having a conductive portion 45 on one surface, with the conductive portion being shaped to provide a desired function as more fully explained hereinafter. The operator assembly 42 includes the meter input shaft 28, a moving contact stylus 50, and a stationary contact stylus 52.

To operate on the function disc assembly 40, the moving contact stylus 50 of the operator assembly 42 is electrically conductive, having its moving point in intimate contact with the function disc 44 and its other end mounted for rotation with the shaft 28 so that as the shaft 28 rotates from angular position to angular position in response to changes in the position of the float 24, the point of the moving stylus 50 moves to different radial distances from the shaft 48 and hence describes different circles on the function disc 44 as the function disc 44 is rotated by the electrical motor 46, which different circles each represent a different position of the float 24.

To provide a stored function to the operator assembly to remove the distortion from the basic information, the conductive portion 45 of the function disc 44 is arranged so that the function represented thereby has a length of a radius from the shaft 48 as its independant variable an arc of a circle on the conductive portion 45 at that distance as its dependant variable so that the distance of the point of the moving stylus 50 from the shaft 48 corresponds to the angle of the meter input shaft 28 and hence to the height of the float 24 and the time during a rotation of the disc that the point of the moving stylus 50 contacts the conductive portion of the disc 44 represents the rate of flow of the liquid corresponding to this height of the float 24.

To convert the signal represented by the time the movable stylus 50 is in contact with the conductive portion 45 of the function disc to signals that are easily used for calculations, the fixed contact stylus 52 has one end in contact with the conductive portion 45 of the function disc 44 and the other end electrically connected in circuit with the moving stylus 50 so that a circuit is completed when both the moving contact stylus 50 and the stationary contact stylus 52 are contacting the conductive portion of the function disc 44. The stylus 52 makes contact with the conductive portion of the function disc 44 at a location where there is a continuous annular conductive portion with a center about the shaft 48 so that the fixed contact stylus 52 is always in electrical contact with a conductive portion of the function disc 44. With this arrangement, the portion of the time that a circuit is completed between the moving contact stylus 50 and the stationary contact stylus 52 corresponds to the function represented by the conductive portion 45 of the disc 44 and therefore the flow rate of the fluid.

Instead of having a conductive portion 45, the function disc 44 may include a portion that passes light. In this embodiment, the stylus 50 includes a light sensor at its tip and the reverse side of the function disc is periodically illuminated to provide the same digital output as when a conductive portion is used but without as much wear or friction between the parts.

To enable the shaft 28 to rotate freely and to prevent damage to the operating parts of the metering assembly 16, the input shaft 28, near its end that is connected to the float arm 26, passes through a seal 54 in the housing 18, with other space-apart portions of the shaft 28 being rotatably mounted within first and second bearings 56 and 58.

To provide a visual indication of the height of the liquid in the weir 12, a liquid height reference assembly 60 is provided having a liquid height reference pointer 62 and a liquid height reference scale 64. The liquid height reference pointer 62 is mounted at one end to the meter input shaft 28 and points at its other end to markers on the liquid height reference scale 64, with the central portion of the liquid height reference pointer extending radially outwardly from the shaft 28 so that the pointer moves along the liquid height reference scale, pointing to different marks on it, as the meter input shaft 28 rotates from angular position to angular position.

While the function-operator section 36 utilizes a function disc 44 having a conductive portion or a light passing portion indicating the desired function, obviously other types of function-operating apparatuses can be used. To be suitable, a function-operating apparatus must be able to remove the irrelevant information and either provide a signal that can be easily integrated or that can be converted to a signal that can be easily integrated.

However, because of its simplicity, the function disc 44 has particular advantages in the fluid meter 10 described herein. One advantage is that a function disc can be prepared using existing printed circuit techniques. Accordingly, different function discs may be inexpensively made available to provide the necessary function for different shaped weirs or for other modifications to the equipment that require a change in the function. Moreover, the function can be computer generated. A second advantage is that the function disc is easily replaceable and may be conveniently ordered and shipped by mail because of its compact size and light weight. A third advantage is that only a small amount of power is required to drive the function disc.

Figure 3:
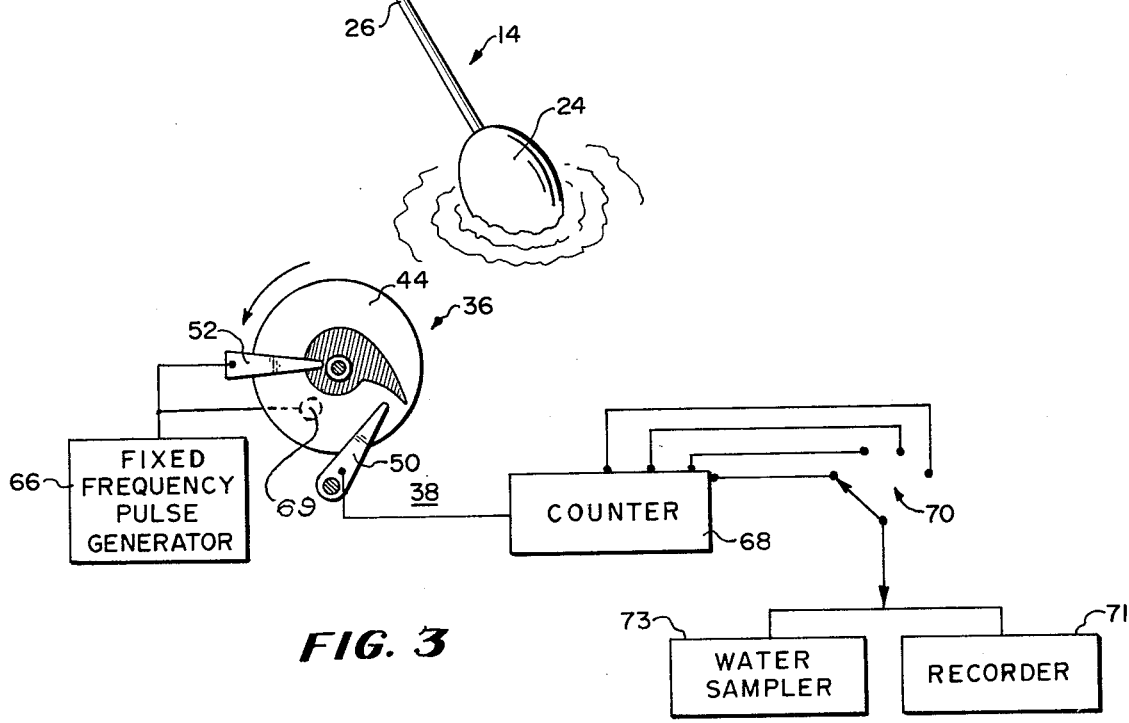
FIG. 3 is a diagramatic view of the principal electrical parts of the flow meter of FIG. 1.

In FIG. 3, there is shown a simplified diagrammatic view of the electronic portion 38 cooperating with the function disc 44 and including a fixed frequency pulse generator 66, a counter 68, and a switch 70, with the fixed frequency pulse generator 66 being part of the function operator section and the counter 68 being the principal part of the calculating section. The switch 70 connects the outputs of the counter 68 to a recorder 71 and a water sampler 73.

The fixed frequency pulse generator 66 is electrically connected to the fixed contact stylus 52 and the counter 68 is electrically connected to the moving contact stylus 50 or the pulse generator 66 is always connected to the counter 66 and activated or deactivated by an electrical connection through the styli 50 and 52. With this arrangement, fixed frequency clock pulses are applied from the fixed frequency pulse generator 66 to the fixed contact stylus 52 and to the moving contact stylus 50 through the conductive portion of the function disc 44 which applies them to the counter 68. In the alternative, the fixed frequency pulse generator may be connected to a gas discharge lamp 69 in an embodiment in which the function disc 44 includes a transparent portion 45 and a light sensor is connected to the counter 68.

The counter 68 includes a plurality of outputs, each of which is connected to a different fixed contact of the multiple position switch 70. The moving contact of the multiple position switch 70 is moved to a selected position to determine the number of counts applied from the fixed frequency pulse generator 68 through the function disc 44 before an output signal from the flow meter 10 is provided to a controlled device and recording equipment. The controlled device may, for example, be a water sampler 73 which is activated to draw a sample of liquid from a body of the liquid each time that a pulse is applied to it through the switch 70.

In assembling the flow meter 10, the function disc 44 is prepared with the proper function 45 to accommodate the location of the liquid level sensing apparatus, which in the preferred embodiment is a float assembly. In the preferred embodiment, the function disc receives information from the operator section 42 which indicates the level of the liquid in the weir 12 and converts this information into signals indicating the rate of flow of the liquid through the body of water containing the weir. For a V-notch weir and a float of the type shown in FIG. 1, the rate of flow of the liquid is proportional to the change in the level of the fluid raised to the five halves power. However, other types of measuring arrangements require a different function and a different function plate must be formed for each different function.

Function plates for different applications of the flow meter 10 are easily fabricated using printed circuit techniques. The appropriate function is prepared by a computer and a conductive material is applied to a plastic disc by photographic techniques in accordance with any of the many prior art methods for performing this operation.

Sometimes the actual environments for measuring the rate of flow are relatively standardized, so that a relatively few different function discs will satisfy a large number of applications for the flow meter. However, different function discs may be easily substituted within a given flow meter and be economically shipped from place to place so that the flow meter 10 is well adapted for use in making measurements in a number of different locations.

To mount the flow meter 10 for measuring the rate of flow of the liquid, the vertical mounting plate 20 is positioned adjacent to a vertical wall, which may be the vertical wall of the weir 12, in front of which the float 24 floats. The vertical mounting plate is mounted to the wall by means of bolts fastened through the wall within the slots 22 at such a location that the float 24 rests in the liquid within the weir area with room to rise and fall with changes in the liquid level without rising above the bottom surface of the metering assembly 16 (FIG. 1).

To adjust the metering assembly 16 in vertical height above the level of the liquid, the bolts are loosened and the metering assembly is moved upwardly or downwardly, with the bolts sliding within the elongated vertical slots 22. The position of the metering assembly may be selected so that the liquid height reference pointer 62 points to a zero reference mark or other calibration mark on the liquid height reference scale 64 when the float 24 is floating freely in the liquid at a selected reference level of the liquid. In this manner, the liquid height indicator is properly calibrated by positioning the metering assembly 16 on the vertical wall of the weir.

In operation, the fluid meter 10 first obtains basic indications from the liquid, which indications contain information concerning the rate of flow of the fluid and also distortion imparted to the indications by factors such as the shape of the channel in which the fluid flows. These indications are operated upon with the function incorporated within the fluid meter 10 to remove the irrelevant information and to convert the relevant information into a form that is easily processed to indicate the rate of flow of the fluid. The rate of flow of the fluid is then integrated to provide information concerning the volume of fluid that is flowing and this information is used to generate control signals that may be used for a variety of purposes, one of which is to actuate a liquid sampler to draw a sample from the body of water.

To obtain basic indications containing information about the rate of flow of the fluid, the float 24 floats within the weir 12. The liquid level within the weir 12 rises as the rate of flow rises and falls as the rate of flow falls causing the float 24 to rise and fall in a manner indicating the rate of flow of the fluid in the body of water.

The indications containing information about the rate of flow are imparted to the meter input shaft 28 through the float arm 26 which rotates radially about the meter input shaft 28 as the float 24 rises or falls, turning the meter input shaft 28 in a manner that reflects the rate of flow of the liquid.

The rotating of the meter input shaft 28 is not ordinarily directly proportional to the rate of flow of the fluid because increase or decrease in the height of the float 24 is also affected by other irrelevant information such as by the nature of the weir 12. In a V-notch weir, such as that shown in FIG. 1, the rate of flow of the fluid is proportional to the changes in the height on the liquid within the weir to the five halves power.

To remove the irrelevant information, the basic indications containing information about the rate of flow of the liquid are imparted by the rotation of the meter input shaft 28 to the moving contact stylus 50 (FIG. 2) which rotates about and with the rotation of the meter input shaft 28, its outer end moving in intimate contact with the function disc 44 to assume a different radial distance from the shaft 48 for each different angular position of the meter input shaft, thus assuming positions with respect to the function disc 44 which are related to the basic indications containing information about the rate of flow of the fluid. While the end of the stylus 50 contacts the discs 44, the motor 48 is rotating the function disc 44 about the shaft 46 so that the moving point of the moving contact stylus 50 describes circles against the function disc 44, which circles vary in diameter with the basic indications.

Each different radius circle described by the moving end of the moving contact stylus 50 crosses a different part of the conductive portion 45 of the function disc 44. The conductive portion of the function disc 44 is prepared so that each of the different diameter circles about the shaft 48 corresponds to a different function that, when operated upon by the operator section 42, removes the irrelevant information from the indications containing both the irrelevant information and information concerning the flow rate of the liquid.

To remove the irrelevant information, the conductive portion 45 is arranged so that the time during each revolution of the function disc 44 that the moving end of the moving contact stylus 50 is describing an arc across the conductive portion compared to the time of a complete revolution of the function disk is proportional to the flow rate. The moving end of the moving contact stylus 50 is positioned by the meter input shaft 28 to describe the correct diameter circle on the function disc 44 for each level of the fluid in the weir 12 as the function disc 44 rotates.

To obtain a signal that is easy to process and is proportional to the flow rate of the liquid, the fixed frequency pulse generator 66 in one embodiment (FIG. 3) applies periodic electrical pulses to the contact stylus 52 so that the conductive portion of the function disc 44 is continually energized with periodic electrical pulses. As the moving end of the moving contact stylus 50 crosses the conductive portion of the function disc 44, it receives the periodic electrical pulses from the conductive portion and applies them to the counter 68. In another embodiment, an electrical connection between the moving contact stylus 50 and the contact stylus 52 through the conductive portion energizes the pulse generator 66 causing it to apply pulses directly to the counter 68. Accordingly, the counter 68 receives a number of pulses that is proportional to the time that the moving end of the moving contact stylus 50 is describing an arc across the conductive portion of the function disc 44. Thus, the number of pulses applied during each revolution of the function disc 44 to the counter 68 represents the flow rate of the liquid.

This process is essentially the same when the function disc 44 includes a light passing portion 45 rather than a conductive portion with the fixed frequency pulse generator 66 being connected to the lamp 69 and the counter 68 being connected to the light sensor 50.

To integrate the flow rate of the liquid to provide indications of the volume of fluid that has flowed past the fluid meter, the switch 70 is set at a selected one of the fixed contacts connected to selected ones of the outputs of the counter 68. With the switch 70 in the set position the counter 68 counts the number of pulses for each revolution of the function plate 44 that represents the rate of flow of the liquid during the time of that revolution. Since the function disc 44 rotates at a constant speed, the sum of the pulses applied to the counter 68 during each revolution represents the integral of the rate of flow of the liquid with respect to time and therefore the amount of fluid flowing past the flow meter. When the counter reaches the output connected to the armature of the switch 70, a pulse is applied indicating that the selected volume of liquid has flowed past the fluid meter 10. This signal may be used to actuate a sampling device to draw a sample from the liquid.

From the above description it can be understood that the fluid meter has several advantages, such as: (1) it is inexpensive; (2) it is light in weight and easy to handle; (3) it is highly accurate; (4) it operates for a relatively long period of time without being reset; and (5) it is durable and able to resist corrosive environments in which it may be used.

The fluid meter 10 is economical because it has relatively few parts and these parts are inexpensive. The integration of the flow rates is performed by an inexpensive counter. The operation of calculating the relationship between the basic indications and the actual rate of flow of the liquid is accomplished by an inexpensive printed circuit disc and moving stylus arrangement. Moreover, it is inexpensive to adapt the meter for use in different environments since it is only necessary to change the function disc, which is a relatively inexpensive unit and easily replaced, to accommodate different measuring conditions.

The flow meter 10 is light in weight and easy to handle because it has few moving parts and does not require any substantial amount of power. The electrical circuit requires a very low power to operate and since it consists essentially of a counter and a pulse generator, both of which may operate at low power levels. There are few moving parts and these moving parts are very light in weight, thus not requiring any substantial amount of power. Since a relatively low power is required a heavy power supply is not necessary and the apparatus is easy to handle and move.

Because of the low power requirement, the unit may run for a long period of time without being reset. The primary consideration in resetting such a unit is the length of time it can run on the power stored within it.

The fluid meter 10 only has one opening that accommodates a continuously moving part. This is the opening accommodating the meter input shaft 28. There is also an electrical inlet and an inlet for selecting the volumes of liquid at which a signal is to be provided. However, these inlets do not move and may be easily sealed. Because the inlets are easily sealed and the casings are of corrosion resistant material, the unit is able to withstand the corrosive environments for long periods of time.

The fluid meter 10 is also very precise. It is precise because there is a relatively low amount of friction. The only moving part is the continuously rotating function disc 44 and the slowly moving input shaft and movable contact stylus 50 and these parts have very little friction.

Although a specific embodiment of the invention has been described in some detail, many modifications and variations in the preferred embodiment are possible without deviating from the invention. Therefore, it is to be understood, that within the scope of the appended claims, the invention may be practiced otherwise than is specifically described.

What is claimed is:

1. Apparatus for measuring the rate of flow of a fluid through a channel, comprising:
   means for generating a signal proportional to the height of the fluid flowing through the channel;
   rotatable means;
   said rotatable means including information stored in a form that can be sensed;
   means for sensing said information;
   means for positioning said means for sensing said information and said rotatable means with respect to each other in accordance with the signal from the means for generating a signal proportional to the height of the fluid flowing through the channel;

said means for sensing including means for generating a plurality of pulses proportional in number to the rate of flow of fluid through said channel from said information;

said information on said rotatable means including indicia indicating a flow rate for at least certain heights of said fluid in said channel whereby the rate of flow through the channel is corrected for non-linear distortion; and means for counting said pulses, whereby a signal is provided indicating the amount of fluid flowing past said means for measuring the height of the fluid in a fixed period of time.

2. Apparatus according to claim 1 further including a water sampler connected to said means for counting said pulses; said counter including means for activating said water sampler at preset counts of said counter, whereby said water sampler is actuated at predetermined increments of volume of fluid flowing past said means for generating a signal.

3. Apparatus according to claim 2 in which the information is recorded on said rotatable means as a pattern of light blocking indecia and portions which do not block light.

4. Apparatus according to claim 2 in which said rotatable means is a printed disc having the information printed upon it.

* * * * *

UNITED STATES PATENT AND TRADEMARK OFFICE
CERTIFICATE OF CORRECTION

PATENT NO. : 3,954,009
DATED : May 4, 1976
INVENTOR(S) : Louis Franklin Lederer

It is certified that error appears in the above-identified patent and that said Letters Patent are hereby corrected as shown below:

Column 3, line 57, change the word "disk" to "disc".

Column 3, line 64, change the word "diagramatic" to "diagrammatic".

Column 3, line 67, change the word "diagramatic" to "diagrammatic".

Column 7, line 5, change "66" to "68".

Column 7, line 22, change "68" to "66".

Column 8, line 34 in both instances change the words "within" to "in front of".

Column 8, line 60, change "48" to "46".

Column 8, line 66, change "46" to "48".

UNITED STATES PATENT AND TRADEMARK OFFICE
CERTIFICATE OF CORRECTION

PATENT NO. : 3,954,009

DATED : May 4, 1976

INVENTOR(S) : Louis Franklin Lederer

It is certified that error appears in the above-identified patent and that said Letters Patent are hereby corrected as shown below:

Column 9, line 17, change the word "disk" to "disc".

Column 9, line 56, change the word "plate" to "disc".

Column 12, line 10, change the word "indecia" to indicia".

Signed and Sealed this

Seventeenth Day of July 1979

[SEAL]

Attest:

Attesting Officer

LUTRELLE F. PARKER
Acting Commissioner of Patents and Trademarks